United States Patent [19]
Gathje et al.

[11] Patent Number: 5,851,499
[45] Date of Patent: Dec. 22, 1998

[54] METHOD FOR PRESSURE OXIDIZING GOLD-BEARING REFRACTORY SULFIDE ORES HAVING ORGANIC CARBON

[75] Inventors: John C. Gathje, Longmont, Colo.; Gary L. Simmons, Albuquerque, N. Mex.

[73] Assignee: Newmont Gold Company, Denver, Colo.

[21] Appl. No.: 712,252

[22] Filed: Sep. 11, 1996

[51] Int. Cl.$^6$ .............................. C01G 7/00; C22B 11/08
[52] U.S. Cl. .................... 423/23; 423/29; 423/30
[58] Field of Search .................. 423/23, 30, 29

[56] References Cited

U.S. PATENT DOCUMENTS

| | | | |
|---|---|---|---|
| 4,552,589 | 11/1985 | Mason et al. | 423/30 |
| 4,610,724 | 9/1986 | Weir et al. | 423/30 |
| 4,923,510 | 5/1990 | Ramadorai et al. | 423/30 |
| 5,096,486 | 3/1992 | Anderson et al. | 75/734 |
| 5,328,669 | 7/1994 | Han et al. | 423/32 |
| 5,458,866 | 10/1995 | Simmons | 423/30 |
| 5,653,945 | 8/1997 | Gathje et al. | 423/30 |

FOREIGN PATENT DOCUMENTS

WO 89/12699  12/1989  WIPO .

OTHER PUBLICATIONS

Ketcham, V.J. et al., "The Lihir Gold Project; Process Plant Design", Minerals Enginerring, vol. 6, Nos. 8–10, pp. 1037–1065, 1993.

*Primary Examiner*—Wayne Langel
*Attorney, Agent, or Firm*—Holme Roberts & Owen

[57] ABSTRACT

Provided is a method for treating refractory gold-bearing ores that have both sulfide material with which the gold is associated and from which the gold is difficult to separate and having organic carbonaceous material having an affinity for at least one of gold and a gold complex. The mineral material is pressure oxidized in the presence of a halogen-containing material in a manner to reduce the susceptibility of the organic carbonaceous material to capture and hold gold during the pressure oxidation. Also provided is a gold-bearing effluent product from the pressure oxidation process. The effluent product comprises gold which can be effectively recovered by carbon-in-leach cyanidation of the effluent product. In many cases, gold recovery according to the present invention is increased substantially over standard pressure oxidation techniques.

31 Claims, 8 Drawing Sheets

METHOD FOR PRESSURE OXIDIZING GOLD-BEARING REFRACTORY SULFIDE ORES HAVING ORGANIC CARBON

FIELD OF THE INVENTION

The present invention involves a method for pressure oxidizing gold-bearing refractory sulfide mineral materials having organic carbonaceous material, and particularly relates to pressure oxidation of such mineral materials in the presence of a halogen-containing material.

BACKGROUND OF THE INVENTION

Gold is difficult to separate from several gold-bearing ores by standard recovery techniques, such as by standard cyanidation processing. These difficult ores are often referred to as refractory. One reason that an ore may be refractory is that the gold in the ore is associated with sulfide minerals from which the gold is difficult to separate. One method for treating these refractory sulfide ores is to pressure oxidize the ore in a acidic environment in the presence of oxygen gas to decompose the sulfide minerals, thereby releasing the gold for subsequent recovery.

Another reason that an ore may be refractory is that the ore contains a significant amount of organic carbonaceous material that is capable of capturing and holding the gold, to the detriment of gold recovery operations. For example, when gold is recovered by cyanidation, a soluble gold-cyanide complex is formed during a cyanide leach. The complex is then adsorbed onto activated carbon granules, from which the gold may subsequently be separated to obtain the gold. When organic carbonaceous material is present in an ore, however, the organic carbonaceous material can adsorb the gold-containing cyanide complex, thereby significantly reducing the amount of the gold-cyanide complex that is available for adsorption on the activated carbon granules, and causing a corresponding reduction in gold recovery. Adsorption of the gold-cyanide complex by the organic carbonaceous material in competition with a gold recovery operation is often referred to as preg-robbing, because the organic carbonaceous material is "robbing" the gold from a solution that is "pregnant" with gold in the form of a soluble gold-cyanide complex.

Refractory ores that contain organic carbonaceous material have not traditionally been considered to be satisfactorily treatable by pressure oxidation because of the preg-robbing problem. In commonly owned U.S. Pat. No. 5,536,480, however, a method is disclosed for pressure oxidizing such carbonaceous refractory ores. The method disclosed in that application involves a combination of very fine sizing of the ore feed with severe pressure oxidation processing to oxidize and/or passivate the preg-robbing organic carbonaceous material.

Ores that are refractory due to the presence of both sulfide minerals and organic carbonaceous material are particularly problematic. The method described in U.S. Pat. No. 5,536,480 can be used for many ores containing both sulfide minerals and organic carbonaceous material. It has been found, however, that under some conditions, ores having both sulfide minerals and organic carbonaceous material are difficult to treat even with the process disclosed in U.S. Pat. No. 5,536,480.

Based on the foregoing, there is a need for additional methods for treating gold-bearing ores that are refractory due to the presence of both sulfide minerals and organic carbonaceous material.

SUMMARY OF THE INVENTION

It has been found that gold recoveries from typical pressure oxidation processing of refractory mineral materials that have both sulfide material and organic carbonaceous material is detrimentally affected when the pressure oxidation is conducted in the presence of one or more halogen-containing materials. Halogen-containing materials may be introduced into the pressure oxidation process in a variety of ways. For example, the mineral material may contain naturally-occurring halogen-containing material. Or, halogen-containing material may be introduced into the pressure oxidation in fresh or recycled process water, such as in the form of dissolved halide salts. The source of halogen-containing materials in recycle water could come from the build-up of material released from the mineral material or could come from various reagents, such as caustic used to neutralize the oxidized slurry or cyanide used to leach gold following neutralization. In fresh process water, the halogen-containing material may be naturally occurring or may be introduced into the water through water pretreatment operations, such as water softening.

The low gold recoveries following pressure oxidation in the presence of halogen-containing material of mineral materials having both sulfide material and organic carbonaceous material is particularly surprising because the low gold recoveries occur even when tests of residues from pressure oxidation show that the preg-robbing ability of the organic carbonaceous material has been successfully eliminated and essentially all of the sulfide material has been decomposed to release the gold. Furthermore, gold recoveries have been found to decrease in the presence of halogen-containing materials with increased severity of pressure oxidation operating conditions. For example, gold recoveries have been observed to decrease with increasing temperature during pressure oxidation. These observations are contrary to conventional thought that increased temperature results in increased gold recovery due to more complete decomposition of the sulfide material and, accordingly, more complete freeing of the gold.

It has been discovered, however, in developing the present invention, that when in the presence of a halogen during pressure oxidation, elemental gold that is freed from association with the sulfide material is susceptible to being captured and held by the organic carbonaceous material. This is a considerably different effect than that of preg-robbing, which involves the adsorption of a gold-cyanide complex. Rather, it is believed that capture of the elemental gold by the organic carbonaceous material occurs through an intermediary of a gold-halide complex. Not to be bound by theory, but to aid in the understanding of the present invention, the mechanism for elemental gold capture by the organic carbonaceous material is believed to involve the following chemical reactions, which are shown representatively for chlorine as the halogen:

Eqn 1: Dissolution of gold as halide complex

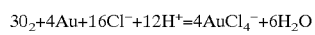

$$3O_2 + 4Au + 16Cl^- + 12H^+ = 4AuCl_4^- + 6H_2O$$

Eqn 2: Precipitation of gold by carbon of organic carbonaceous material

$$3C + 6H_2O + 4AuCl_4^- = 4Au + 16Cl^- + 3CO_2 + 12H^+$$

For the reactants of Eqn. 1, the $O_2$ is primarily supplied from oxygen gas introduced into the pressure oxidation process to oxidize the sulfide sulfur and the H+ is primarily supplied by sulfuric acid added to the feed slurry or generated during the pressure oxidation. The C in Eqn. 2 is provided primarily by the organic carbonaceous material.

In one aspect of the present invention, a method is provided for pressure oxidation of a gold-bearing mineral material having sulfide material from which the gold is difficult to separate and having organic carbonaceous material that has an affinity, in the presence of a solubilized halogen, for at least one of gold and a gold-halide complex. Feed to the pressure oxidation includes a halogen-containing material having halogen that, during pressure oxidation, is in a solubilized form that is capable of complexing with gold that becomes freed from association with the sulfide material. The pressure oxidation of the present invention is conducted under conditions to suppress the susceptibility of gold to be captured and held by the organic carbonaceous material, such that greater than about 75%, and preferably even more, of the gold from the original mineral material is removable, by carbon-in-leach cyanidation, from solid residue of the pressure oxidation. The gold-bearing mineral material may be an ore, ore concentrate, tailings from prior processing, or other material having gold-bearing mineral components.

According to the present invention, suppression of the susceptibility of gold to be captured and held by the organic carbonaceous material may be accomplished in a variety of ways. For example, reaction conditions may be varied to reduce the kinetics of gold dissolution (Eqn. 1) and/or gold deposition on the organic carbonaceous material (Eqn. 2). Also, reactive conditions could be varied to shift to the left the equilibrium of one or both of the gold dissolution reaction (Eqn. 1) and the gold deposition reaction (Eqn. 2). Alternatively, a component could be introduced during the pressure oxidation to bind the halogen in a form that substantially prevents participation of the halogen in the dissolution and subsequent capture of elemental gold by the organic carbonaceous material.

Specific operating conditions for pressure oxidation to suppress the susceptibility of gold to be captured and held by organic carbonaceous material, according to the present invention, include one or more, in any combination, of the following:

1. A temperature of lower than about 215° C.;
2. A ratio, on a weight basis, of sulfide sulfur to carbonate in the mineral material feed of smaller than about 4:1;
3. Maintaining aqueous effluent liquid from pressure oxidation at an oxidation/reduction potential (ORP) of smaller than about 700 millivolts, relative to a standard hydrogen electrode;
4. Maintaining aqueous effluent liquid from pressure oxidation at an acid level of less than about 28 grams of free sulfuric acid per liter of the effluent liquid;
5. Conducting the pressure oxidation in the presence of carbon dioxide at a partial pressure larger than that which would be exerted by carbon dioxide generated from carbon released by decomposition of the mineral material during pressure oxidation;
6. Conducting the pressure oxidation in the presence of a component causing formation of a halogen-containing reaction product that is insoluble during the pressure oxidation, to prevent halogen in the reactive product from forming a complex with gold;
7. Conducting the pressure oxidation in the presence of a component capable of causing formation of a stable, soluble complex with halogen present during pressure oxidation, such that formation of a gold complex with the halogen is inhibited;
8. Restricting oxygen gas used for the pressure oxidation so that reaction conditions in the reactor are such as to prevent substantially complete oxidation of ferrous iron to ferric iron during the pressure oxidation;
9. Conducting the pressure oxidation in a batch operation rather than in a continuous operation;
10. Conducting the pressure oxidation with a retention time of shorter than about 45 minutes; and
11. Conducting the pressure oxidation with a mineral material feed that comprises a blend of a first mineral material with a second mineral material that has a higher carbonate content than the first mineral material.

In another aspect, the present invention provides a gold-containing effluent product from pressure oxidation, in the presence of a halogen-containing material, of a gold-bearing mineral material having sulfide material and organic carbonaceous material. The effluent material comprises solid effluent and aqueous liquid effluent from the pressure oxidation, with the solid effluent comprising gold from the mineral material feed and carbonaceous residue of the organic carbonaceous material of the mineral material feed. The effluent product is further characterized by the presence in the solid effluent material of gold from the original mineral material feed, with greater than about 75%, and preferably even more, of the gold in the solid effluent material being removable by carbon-in-leach cyanidation. This gold-containing effluent material is a valuable product that can be further processed to recover gold from the solid effluent by carbon-in-leach cyanidation or other known recovery methods. The gold in the solid effluent is substantially not held by residue of organic carbonaceous material in a manner that would inhibit standard recovery operations, such as standard carbon-in-leach cyanidation.

DETAILED DESCRIPTION OF THE INVENTION

Figure 1:
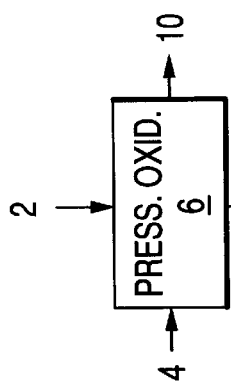
FIG. 1 is a flow diagram of one embodiment of a method of the present invention for producing a gold-bearing effluent product.

The gold-bearing mineral material feed of the process of the present invention is refractory to gold recovery due to the presence of sulfide material with which the gold is associated and from which the gold is difficult to separate. The mineral material feed also comprises organic carbonaceous material that is capable of capturing and holding gold during pressure oxidation when a halogen-containing material is part of the pressure oxidation feed. The mineral material feed is typically sized such that at least about 80 weight percent of the feed particles are smaller than about 75 microns (200 mesh) and more preferably smaller than about 38 microns (400 mesh). The mineral material feed is slurried with water to prepare a feed slurry for the pressure oxidation processing. The present invention is particularly useful for mineral material feeds in which less than about 60% of the gold is recoverable by direct cyanidation techniques, and even more particularly useful for ores in which less than 40% of the gold is recoverable by direct cyanidation.

The sulfide material, with which the gold is associated, typically comprises one or more of the following sulfide minerals: pyrite, marcasite, pyrrhotite and arsenopyrite. The organic carbonaceous material may be any carbonaceous material having an affinity for at least one of gold, a gold salt or a gold complex. This affinity, however, may vary widely depending upon the type, origin, hydrophobicity, porosity and other properties of the carbonaceous material. Generally, the amount of organic carbonaceous material in a mineral material is determined as the total amount of carbon in the mineral material except that which is present in a carbonate group. The present invention is particularly useful for whole ores, and concentrates of such whole ores, having greater than about 0.3 weight percent of the organic carbonaceous material. The present invention is more particularly useful for ores having greater than about 0.4 weight percent of the organic carbonaceous material and even more particularly beneficial for ores having greater than about 0.6 weight percent of the organic carbonaceous material. Although the severity of the gold capture problem is generally expected to increase with increasing amounts of the organic carbonaceous material, the organic carbonaceous material of some ores is particularly active and even small amounts, such as around 0.3 weight percent or less, can cause significant problems during pressure oxidation processing.

The halogen-containing material may be part of the mineral material feed or may be introduced into the feed in another manner. The present invention is particularly useful for mineral materials having naturally-occurring halogen-containing material that, when the mineral material is pressure oxidized, provides one or more halogen in a solubilized form, such as a soluble halide, that is available to complex with gold and thereby facilitate capture of gold by organic carbonaceous material. Naturally-occurring halogen-containing material in ores is often in the form of small liquid inclusions having dissolved halide salts. The halogen-containing material need not, however, be part of the mineral material feed. For example, when recycle water is used to prepare the feed slurry for pressure oxidation, significant concentration levels of dissolved halide salts can build up in the recycle water, which can cause problems during pressure oxidation. Also, a significant amount of dissolved halides can be introduced into recycle water by various reagent formulations. For example, caustic formulations used to neutralize the effluent slurry from pressure oxidation and sodium cyanide formulations used to extract gold from the effluent slurry both often contain significant quantities of halide salts. Furthermore, fresh process water can sometimes contain significant quantities of dissolved salt, especially when sea water or brackish water is used. Moreover, if fresh process water is softened prior to use, many water softening operations can introduce significant quantities of dissolved halides into the water.

The detrimental effect from any given level of halogen-containing material will depend upon the specific conditions for any pressure oxidation process, including the activity of the organic carbonaceous material and the composition of the mineral material. The method of the present invention is generally useful, however, for pressure oxidation in which the dissolved halogen concentration in effluent aqueous liquid from pressure oxidation is larger than about 5 milligrams per liter of the effluent liquid and especially when the concentration is larger than about 15 milligrams per liter. In some instances, however, significant problems do not occur until dissolved halogen concentrations reach 50 to 100 milligrams of halogen per liter, or more. As used herein, halogen includes one or a combination of any of chlorine, bromine and iodine, with chlorine being the most common encountered. A halogen-containing material is a material having the halogen.

The process of the present invention is well-suited for pressure oxidation feeds having halogen-containing material with halogen in an amount of greater than about 20 parts per million by weight relative to the weight of mineral material. The pressure oxidation process of the present invention is particularly useful for feeds having greater than about 35 parts per million, and more particularly for feeds having greater than about 50 parts per million, of halogen by weight relative to the mineral material. During the pressure oxidation, the halogen of the halogen-containing material is in a solubilized form, typically a soluble halide.

The present invention is particularly well-suited for pressure oxidation treatment of refractory gold-bearing sulfide mineral materials that demonstrate poor gold recoveries due to the presence of organic carbonaceous material when subjected to traditional pressure oxidation conditions in the presence of the halogen-containing material. Traditional severe pressure oxidation conditions include high temperatures, high oxygen input and high levels of acid in the discharge. Unexpectedly, and surprisingly, however, the mineral materials most suited for treatment by the present invention exhibit poor gold recoveries from typical pressure oxidation processing conditions when pressure oxidized with the halogen-containing material. The solid residue of the organic carbonaceous material, following pressure oxidation, may hold up to 50% or more of the gold in a manner to render that gold unrecoverable by standard carbon-in-leach cyanidation techniques. By adjusting operating conditions of the pressure oxidation according to the present invention, however, the amount of gold held by the organic carbonaceous residue following pressure oxidation may be reduced to less than about 25%, and preferably to less than about 10%, of the gold in the solid residue. With the present invention, gold recovery may be increased from as low as 60% or less to greater than about 75%, more preferably greater than about 80%, and most preferably greater than about 85% of the gold originally present in the mineral material feed.

For example, typical severe, continuous pressure oxidation processing of a gold-bearing refractory sulfide ore may, for reference purposes, include a temperature of about 225° C., an oxygen gas overpressure of 100 psi, a residence time of about one hour, and effluent liquid having about 30 grams per liter of sulfuric acid. These reference operating conditions are adequate for treating most refractory sulfide mineral materials. These reference conditions, however, have not been found adequate for treating mineral materials having both sulfide material and organic carbonaceous material when processed with a halogen-containing material. With the process of the present invention, however, gold recovery may be increased by at least 10%, preferably by at least 25%, and most preferably by at least 50% (based on carbon-in-leach cyanidation following pressure oxidation), relative to gold recovery when the pressure oxidation is conducted at the above-stated reference conditions.

The key to high recoveries according to the process of the present invention is to conduct the pressure oxidation operation in a way to reduce the susceptibility of gold to be captured and held by the organic carbonaceous material during pressure oxidation, thereby rendering the residue from pressure oxidation more susceptible to high gold recoveries during subsequent gold recovery processing (typically carbon-in-leach cyanidation).

One way to reduce the susceptibility of gold to be captured and held by the organic carbonaceous material is to conduct the pressure oxidation at a temperature that is smaller than about 215° C., and more preferably smaller than about 205° C. Particularly preferred is a temperature of smaller than about 195° C.

The use of a lower pressure oxidation temperature is believed to reduce the amount of gold captured and held by the organic carbonaceous material by reducing the kinetics of formation of a gold-halide complex according to Eqn. 1. When less gold is complexed, less gold is available for capture by the organic carbonaceous material according to Eqn. 2.

Another way to reduce the susceptibility of the gold to be captured and held by the organic carbonaceous material during pressure oxidation is to feed a carbonate-rich material into the pressure oxidation along with the mineral material feed. Materials such as dolomite or limestone could be used as the carbonate-rich material. Also, the mineral material feed could comprise a blend of two or more different gold-bearing mineral materials, one having a lower carbonate content and one having a higher carbonate content. For example, a low carbonate-containing mineral material, such as one having a weight ratio of sulfide sulfur to carbonate of greater than 5:1, could be blended with a second mineral material having a very high carbonate content, with the resulting blend the desired ratio of sulfide sulfur to carbonate. When blending, it is preferred that the blended mineral material feed have a weight ratio of sulfide sulfur to carbonate of smaller than about 4:1, more preferably smaller than about 3:1, and even more preferably smaller than about 2:1. Particularly preferred are blended mineral material feeds having a weight ratio of sulfide sulfur to carbonate of from about 0.5:1 to about 2:1. Below a ratio of about 0.5:1, however, acid production during pressure oxidation may be insufficient to obtain adequate oxidation of the sulfide minerals. In computing the weight ratio of sulfide to carbonate, weight attributable to the sulfide sulfur in the sulfide materials is divided by the weight attributable to carbonate ($CO_3$) in carbonate-containing components. It is believed that having a low ratio of sulfide sulfur to carbonate in the feed is beneficial because the amount of carbon dioxide produced during pressure oxidation is increased due to decomposition of the additional carbonate. An increased concentration of carbon dioxide drives the reaction of Eqn. 1 to the left by reducing available acid and also drives the reaction of Eqn. 2 to the left, thereby decreasing the amount of gold that is captured and held by the organic carbonaceous material.

Blending to attain a low ratio of sulfide sulfur to carbonate in the mineral material feed works well with a number of mineral materials to provide satisfactory gold recoveries following pressure oxidation. In those circumstances when high carbonate content materials are available for blending, the detrimental effects of the halogen-containing material can be sufficiently controlled without major changes to typical pressure oxidation operating conditions. For some mineral materials, however, blending alone is not adequate, perhaps due to the presence of an extremely active organic carbonaceous material. In those circumstances, it is generally necessary to make other adjustments to the pressure oxidation operating conditions, such as lowering the treating temperature, reducing oxygen input or making other adjustments as discussed herein. Often, best results will be attained by combining a number of the different control techniques discussed herein.

One way to reduce the susceptibility of gold to be captured and held by the organic carbon is to operate the pressure oxidation in a way to keep the ORP from becoming too high in effluent liquid from pressure oxidation. As used herein the ORP is relative to a standard hydrogen reference electrode. According to this embodiment of the present invention, the ORP of the effluent liquid from pressure oxidation should be kept at a level that is at least about 25 millivolts below the ORP that would be exhibited if the mineral material feed had been pressure oxidized according to the reference conditions stated previously. Typically, with the present invention, the ORP of the effluent liquid should be lower than about 700 millivolts, and preferably lower than about 650 millivolts, although the exact ORP will vary depending upon the specific mineral material. The ORP may be held at a low level by, for example, reducing the input of oxygen into the pressure oxidation or reducing the residence time.

Another way to reduce the susceptibility of the gold to be captured and held by the organic carbonaceous material is to maintain effluent liquid from pressure oxidation at a free acid content of less than about 28 grams of free sulfuric acid per liter of effluent liquid, preferably smaller than about 25 grams per liter and more preferably smaller than about 20 grams per liter. Particularly preferred with the present invention is to maintain the effluent liquid at a free sulfuric acid content of from about 7 grams per liter to about 25 grams per liter.

Another way to reduce the susceptibility of the gold to be captured and held by the organic carbonaceous material is to maintain a partial pressure of carbon dioxide at a partial pressure that is higher than the partial pressure of carbon dioxide that would be generated in the autoclave from decomposition of the mineral material feed. For example, gaseous carbon dioxide could be fed into a pressure oxidation autoclave in addition to the oxygen gas. Increasing the partial pressure of carbon dioxide will tend to drive the equilibrium of the reaction of Eqn. 2 to the left, to reduce the capture of gold by the organic carbonaceous material.

Another way to reduce the susceptibility of the gold to be captured and held by the organic carbonaceous material is to restrict the amount of oxygen gas fed to the pressure oxidation. Reducing the concentration of oxygen during pressure oxidation drives the equilibrium of the reaction of Eqn. 1 to the left, and thereby tends to reduce the concentration of the gold-halide complex that is available for participation in the deposition reaction of Eqn. 2. According to this embodiment of the present invention, oxygen to the reactor is kept at a level that is below a level at which substantially all iron dissolved in effluent liquid from the pressure oxidation process is in the ferric state. Preferably at least about 10 mole % of soluble iron in the effluent liquid is in the ferrous state, more preferably greater than about 20 mole %, and most preferably greater than about 50 mole %.

Another way to reduce the susceptibility of gold to be captured and held by the organic carbonaceous material is to perform the pressure oxidation as a continuous process with a short retention time. Preferably the retention time is shorter than about 45 minutes, and more preferably shorter than about 30 minutes. It is believed that a short retention time during continuous processing provides operating conditions embodying lower ORP and higher ratios of $Fe^{+2}$ and $Fe^{+3}$, which reduces the kinetics of gold/halide dissolution (Eqn. 1).

Although a continuous process is preferred for the pressure oxidation, an alternative is to operate the pressure oxidation in a batch mode to reduce susceptibility of gold to be captured and held by the organic carbonaceous material. It has been found that when the pressure oxidation is conducted in a batch mode with a sufficiently long retention, that the organic carbonaceous material is satisfactorily destroyed and/or passivated to the extent that it is incapable of holding a substantial quantity of gold.

Yet another way to reduce the susceptibility of the gold to be captured and held by the organic carbonaceous material is to introduce a component into the pressure oxidation that is capable of reacting with halogen from the halogen-containing material, to thereby prevent the halogen from complexing with gold. Accordingly, the amount of gold that is susceptible to capture by the organic carbonaceous material is reduced. In one embodiment, the feed comprises a component that, during pressure oxidation, causes the formation of an insoluble reaction product involving the halogen, thereby removing the halogen as a threat for gold complexation and reducing the amount of gold-halide complex that is available to participate in the capture of gold by organic carbonaceous material. Example components of this variety include silver, mercury, lead and bismuth metals and compounds having those metals in a form that is capable of reacting to form the insoluble reaction product. In another embodiment, the component may form a stable, soluble complex with a halogen, thereby inhibiting the halogen from complexing with gold. Examples of components of this variety include copper, lead, zinc, cobalt, bismuth and tin and compounds having those metals in a form capable of reacting to form the stable, soluble complex. Some components, such as lead and bismuth, will form either a soluble or insoluble complex with the halogen, depending upon the specific attributes of the mineral material and specific pressure oxidation operating conditions. In any event, the component may be a discrete component that is added to the feed or may be part of a mineral material that is blended with one or more other mineral materials to form the mineral material feed.

The present invention also provides an effluent product resulting from pressure oxidation, in the presence of a halogen-containing material, of a gold-bearing mineral material feed comprising sulfide material and organic carbonaceous material. The effluent product is valuable in that gold in the effluent material is easily recoverable by a variety of recovery techniques, and especially by carbon-in-leach cyanidation.

Referring to FIG. 1, one embodiment of the process is shown for producing the effluent product of the present invention. As shown in FIG. 1, a feed slurry 2 comprising the mineral material feed slurried in an aqueous liquid, is subjected to pressure oxidation 6, which is typically carried out in one or more autoclaves. A gas 4 that is rich in oxygen is contacted with the feed slurry to provide oxygen to oxidize sulfide sulfur in the mineral material to a sulfate form. Offgases 10 are collected for treatment and eventual release.

The effluent product 8 includes solid effluent, which is the solid residue from the pressure oxidation 6, mixed with an aqueous liquid effluent. The aqueous liquid effluent has a pH of smaller than about 1.5, and preferably has free sulfuric acid, as discussed previously, in an amount of smaller than about 28 grams per liter of the aqueous effluent liquid. The solid effluent of the effluent product 8 comprises substantially all of the gold from the feed slurry 2. Greater than about 75%, preferably greater than about 80% and more preferably greater than about 85% of gold in the solid effluent is removable from the solid effluent by carbon-in-leach cyanidation. The high gold recoveries from the effluent product 8 of the present invention are attainable because only a small percentage, typically less than about 25% or less, of the gold in the solid effluent is held by residue of the carbonaceous material.

Typically, the effluent product 8 of the present invention is neutralized and subjected to carbon-in-leach cyanidation to recover the gold therefrom. Other gold recovery methods could, however, be used instead.

EXAMPLES

The following examples further demonstrate the present invention, without limiting the scope thereof. Representative analyses for ore samples A through I used in the following examples are shown in Table 1. All of these ore samples are from gold-bearing deposits in Nevada, U.S.A. Ore samples A–F, however, are drill samples obtained using a potassium chloride drill fluid. Those samples are, therefore, contaminated with potassium chloride from the drilling operation. Sample G was taken from the same zone as sample B, but using a drill fluid not having a chloride salt, so that Sample G is not contaminated with a chloride. Sample G has no appreciable amount of naturally-occurring halogen. Samples H and I are ore samples that have particularly active organic carbonaceous material and a sufficient amount of naturally-occurring halogen to present a problem under standard pressure oxidation processing conditions.

TABLE 1

| Sample | Gold Oz/st[1] | Sulfide Sulfur wt. % | Organic Carbon wt. % | Halogen[2] wt. % | $CO_3$ wt. % |
|---|---|---|---|---|---|
| A | 0.270 | 5.68 | 0.46 | 0.02 | 0.69 |
| B | 0.196 | 5.91 | 0.39 | 0.01 | 0.51 |
| C | 0.342 | 4.93 | 0.45 | 0.09 | 0.46 |
| D | 0.248 | 4.72 | 0.41 | 0.04 | 4.18 |
| E | 0.186 | 3.68 | 0.13 |  | 7.43 |
| F | 0.209 | 4.13 | 0.24 | 0.03 | 9.25 |
| G | 0.160 | 5.99 | 0.35 | <0.02 | 0.06 |
| H | 0.104 | 2.05 | 1.66 | <0.005 | 4.96 |
| I | 0.232 | 1.65 | 1.60 | <0.005 | 20.3 |

[1]Ounces of gold per standard short ton of ore
[2]Total of $Cl^-$, $Br^-$ & $I^-$ (titratable with silver nitrate)

EXAMPLE 1

This example demonstrates the effect of pressure oxidation temperature and residence time on gold recovery of refractory sulfide ores having organic carbonaceous material and that are pressure oxidized in the presence of a halogen-containing material.

A continuous pressure oxidation pilot plant is conducted using a four stage, stirred autoclave. Ore samples are fed one at a time into the autoclave in a slurry with water at about 40% solids. Each ore sample is sized so that 80% of the particles are smaller than about 20–22 microns. During pressure oxidation, oxygen overpressure to the autoclave is held at about 100 psi and retention time in the autoclave is about 60 minutes. The autoclave is operated at 200° C. for some runs and 225° C. for other runs.

Ore samples B and C are processed in the pilot plant. During pressure oxidation, samples are taken from each of the four compartments of the autoclave as well as from the autoclave discharge. Each sample is neutralized to a pH of about 10.5 using milk of lime. The neutralized samples are then subjected to a 24-hour laboratory bottle-roll carbon-in-leach cyanidation test to determine gold extractions. Results for autoclave compartment samples provide information concerning the effect of pressure oxidation as a function of time.

Figure 2:
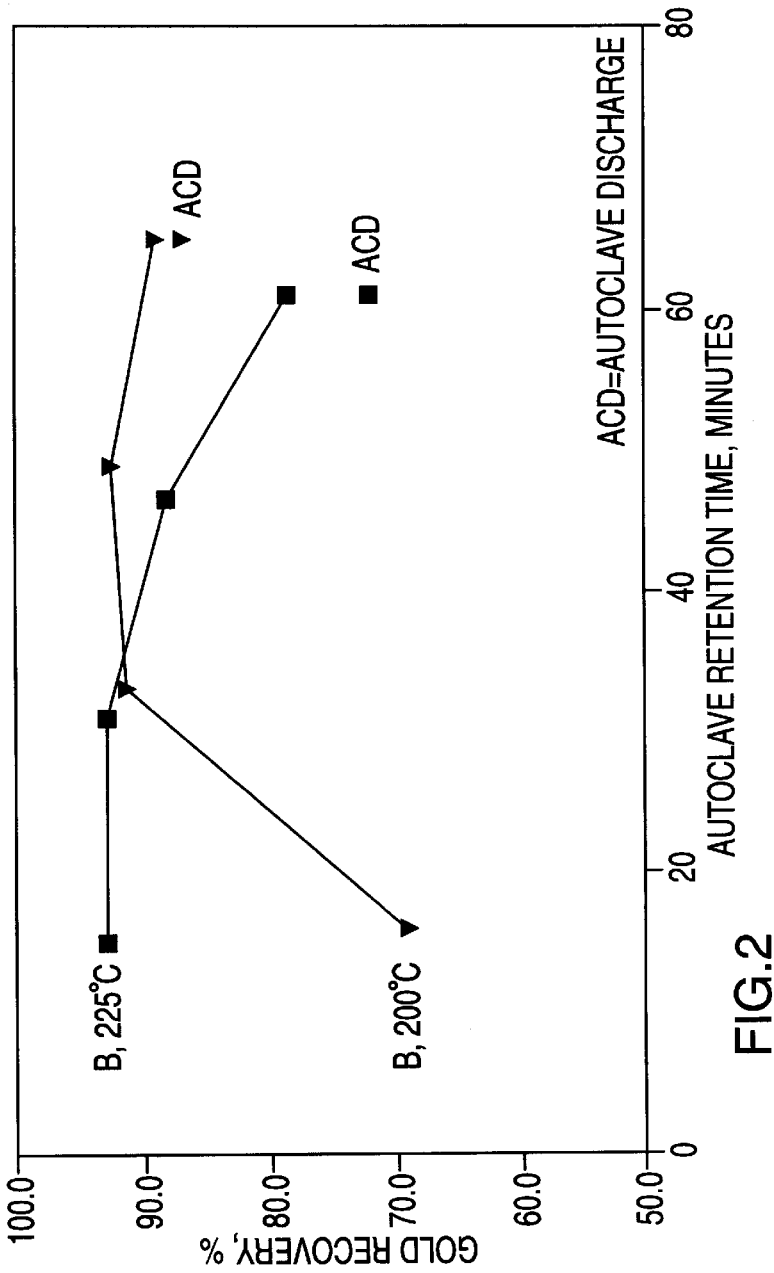
FIG. 2 is a graph showing the effect of pressure oxidation temperature and retention time on gold recoveries according to the present invention.
Figure 3:
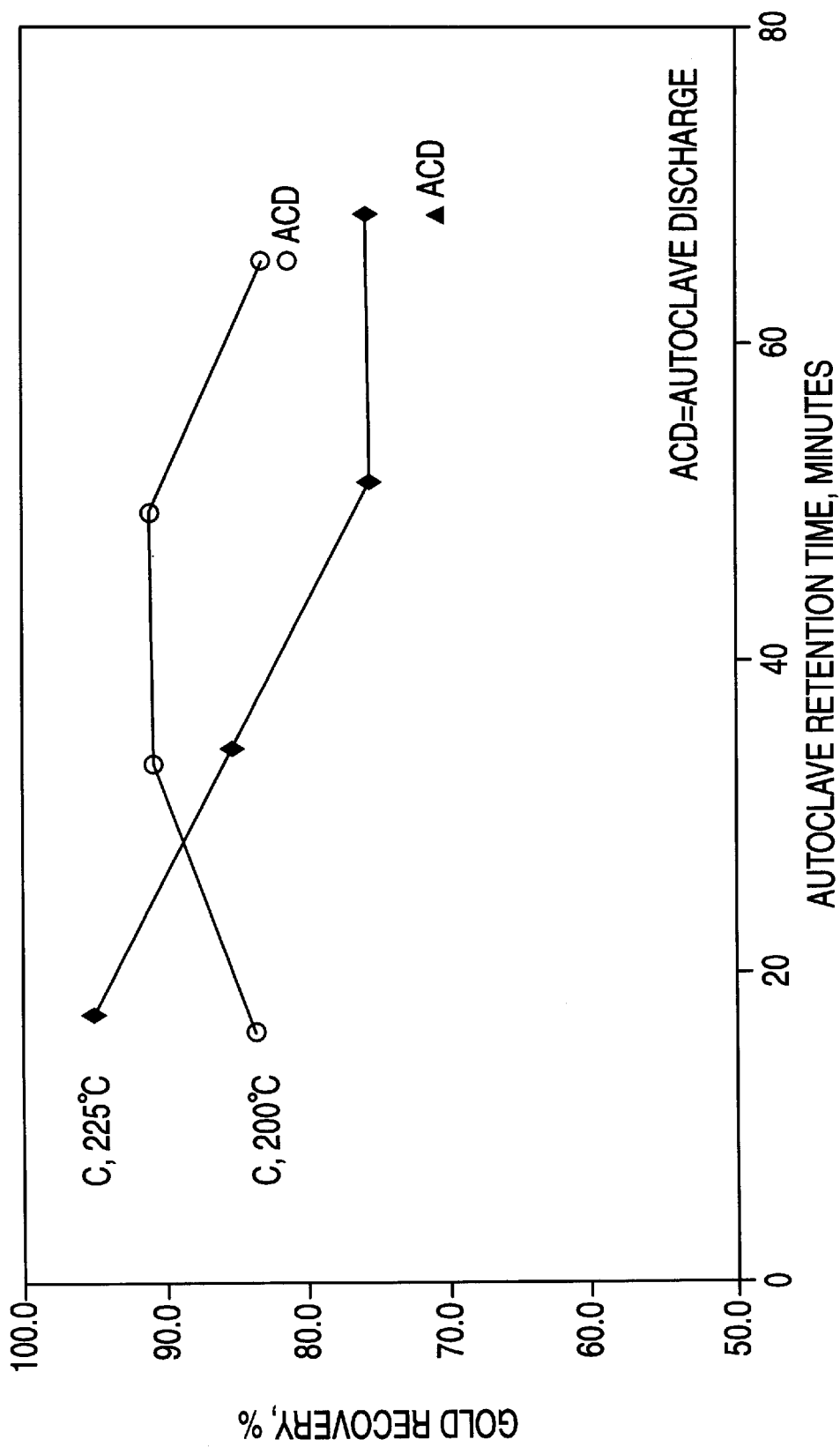
FIG. 3 is a graph showing the effect of temperature and retention time on gold recovery according to the present invention.

FIG. 2 shows a graph of gold recovery versus autoclave retention time for the two temperature conditions for ore Sample B and FIG. 3 shows the same information for ore Sample C. As seen in FIGS. 2 and 3, for pressure oxidation at 225° C., recoveries drop significantly for the longer retention times. This is contrary to conventional thought concerning pressure oxidation, which is that gold recovery increases with increased residence times. Much higher gold recoveries are attained in the 200° C. tests than in the 225° C. tests. Also, for the 200° C. tests, there is a range of retention times in a maximum gold recovery region, with gold recovery dropping off significantly for both shorter and longer retention times. The test results are tabularly shown in Table 2.

that gold recoveries increase with increasing pressure oxidation temperature.

TABLE 3

| Sample | Temp. C. | Gold Recovery |
|---|---|---|
| A | 180 | 91.1 |
| A | 190 | 90.0 |
| A | 200 | 91.1 |
| A | 210 | 88.2 |
| A | 225 | 69.5 |

EXAMPLE 3

This example demonstrates the effect of varying the weight ratio of sulfide sulfur to carbonate in the pressure oxidation feed.

Using ore Sample A, a pilot plant is conducted as described in Example 1. Various amounts of limestone, dolomite or acid are added to ore Sample A to form the feed to the autoclave. Autoclave discharge samples are collected, neutralized and subjected to carbon-in-leach testing to determine gold recovery as described in Example 1.

Figure 5:
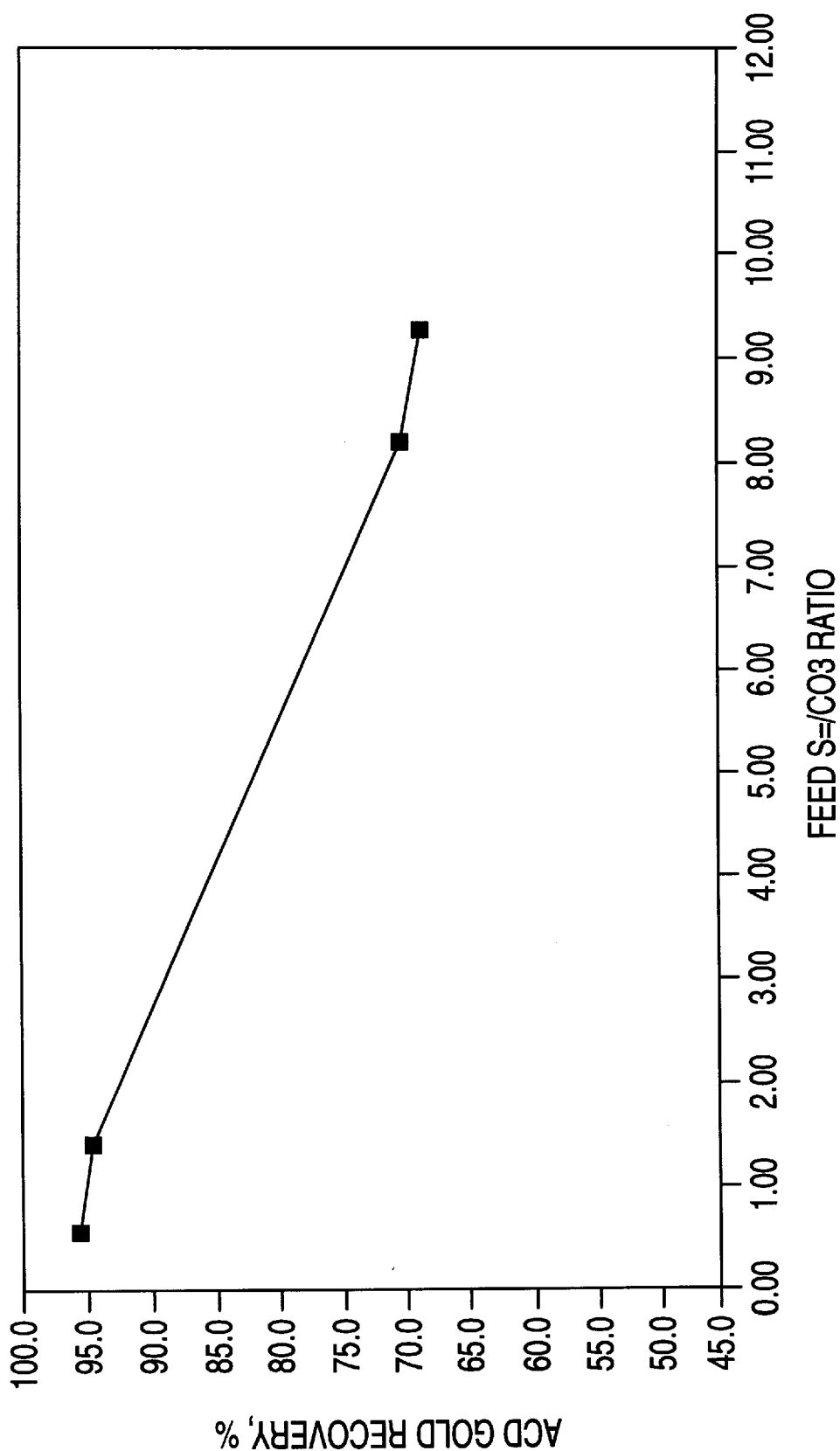
FIG. 5 is a graph showing the effect of the weight ratio of sulfide sulfur to carbonate in feed to pressure oxidation on gold recovery according to the present invention.
Figure 6:
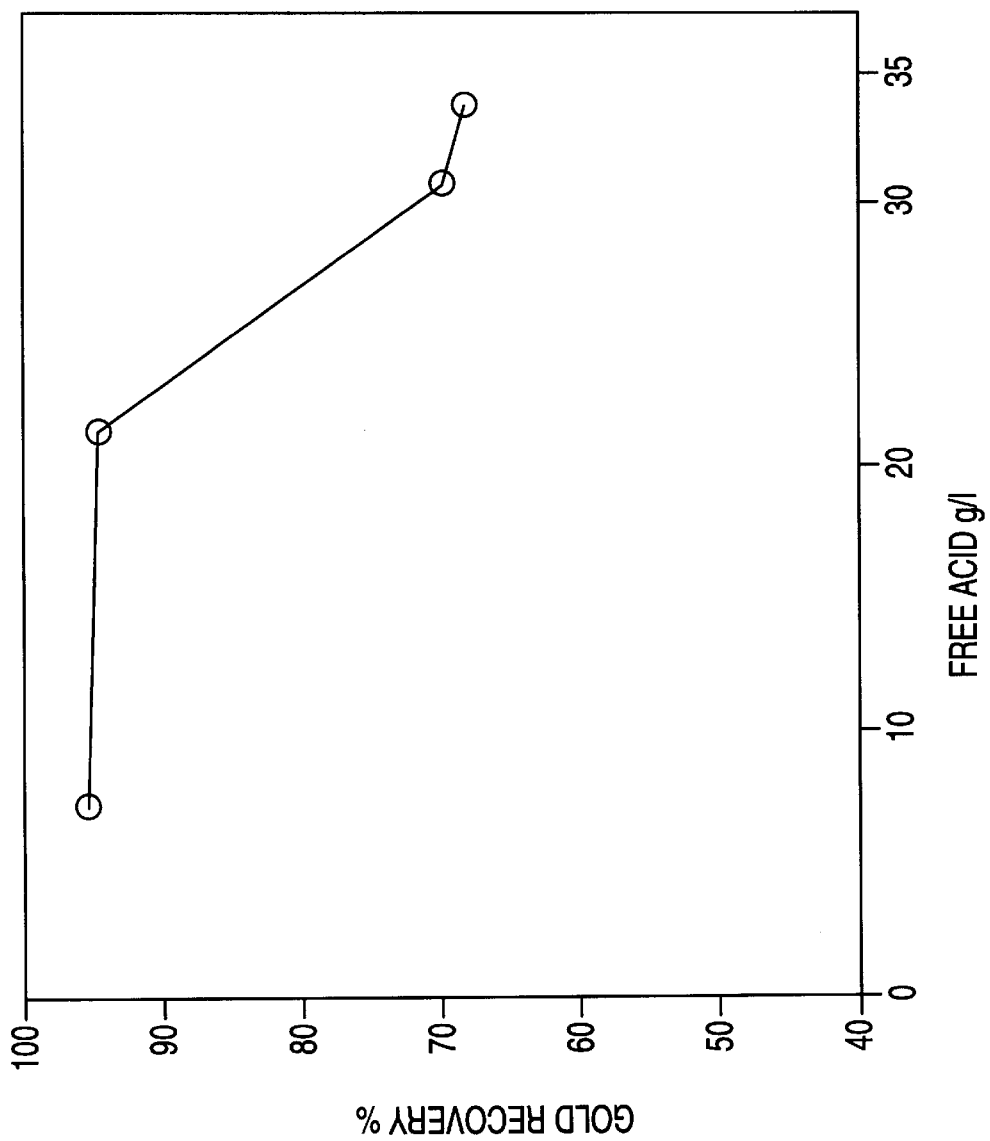
FIG. 6 is a graph showing the effect of free acid in liquid discharge from pressure oxidation relative to gold recovery according to the present invention.

The results are shown graphically in FIGS. 5 and 6 and tabularly in Table 4. As shown in FIGS. 5 and 6 and Table

TABLE 2

| Sample | Temp. °C. | Total Time Min | Gold Recoveries % | | | | | Halogen Conc. mg/l[1] |
|---|---|---|---|---|---|---|---|---|
| | | | Stage 1 | Stage 2 | Stage 3 | Stage 4 | Discharge | |
| B | 225 | 63 | 92.5 | 93 | 88 | 78.5 | 71.9 | 60 |
| B | 200 | 64 | 69 | 91.5 | 92.5 | 88.5 | 86.7 | 130 |
| C | 225 | 68 | 96 | 85 | 76 | 76.5 | 71.1 | 140 |
| C | 200 | 66 | 83 | 91 | 91.5 | 83 | 81.6 | 150 |

[1]Total of halogens titrated by silver nitrate (Cd$^-$, I$^-$ & Br$^-$) in the autoclave discharge liquid

EXAMPLE 2

This example further demonstrates the effect of temperature on gold recovery for refractory sulfide ores having organic carbonaceous material pressure oxidized in the presence of a halogen-containing material.

Figure 4:
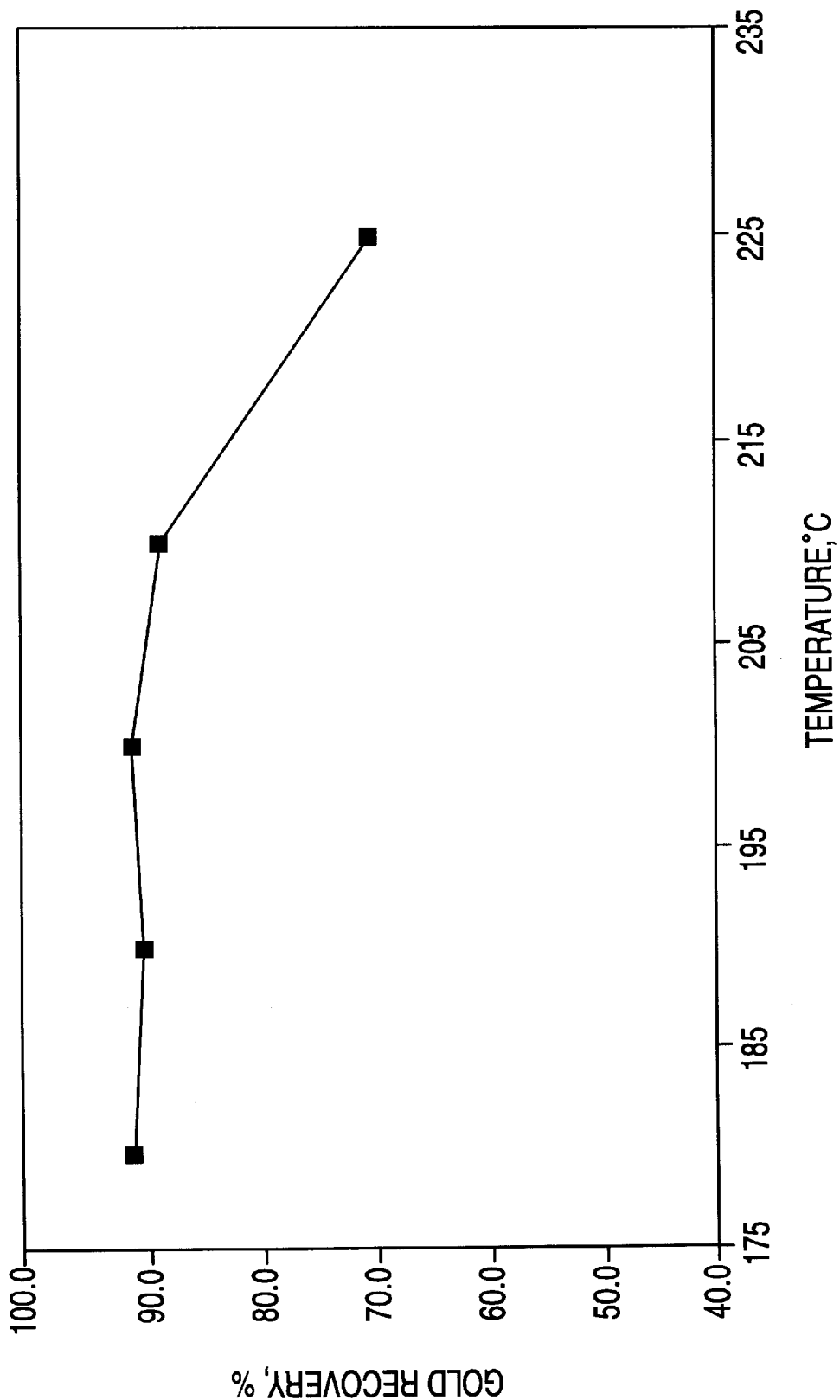
FIG. 4 is a graph showing the effect of temperature on gold recovery according to the present invention.

Using ore Sample A, a pilot plant is operated as described in Example 1, but with the temperature being varied from 180° C. to 225° C. Samples of autoclave discharge are subjected to cyanide-in-leach cyanidation as described in Example 1. The results are shown graphically in FIG. 4 and tabularly in Table 3. As seen in FIG. 4 and Table 3, gold recovery declines substantially at higher temperatures. Again, such a result is contrary to the conventional belief 4, gold recovery increases with a decreasing ratio of sulfide sulfur to carbonate in the feed and with decreasing free acid concentrations in the discharge liquid from the autoclave. It should be noted, however, that if carbonate levels in the feed become too high, then sufficient acid will not be generated during pressure oxidation to adequately oxidize the sulfide sulfur.

TABLE 4

| Sample | Temp °C. | Additive to Feed | Wt. ratio Sulfide sulfur to carbonate | Gold Recovery % | Acid[1] g/l | Halogen[2] mg/l |
|---|---|---|---|---|---|---|
| A | 225 | 45 lb/st acid[3] | 9.30 | 67.9 | 33.8 | |
| A | 225 | None | 8.23 | 69.5 | 30.8 | |
| A | 225 | 5% dolomite | 1.48 | 94.3 | 21.5 | 134 |
| A | 225 | 15% limestone | 0.61 | 95.4 | 7.3 | |

[1]Grams free $H_2SO_4$ per liter of discharge liquid
[2]Total of halogens titrated by silver nitrate (Cl$^-$, Br$^-$, I$^-$) in discharge liquid
[3]Pounds of sulfuric acid added per standard short ton of ore sample

EXAMPLE 4

This example demonstrates use of a feed having a blend of two different ores, one having a greater carbonate content than the other, to alter the weight ratio of sulfide sulfur to carbonate in the feed.

Pressure oxidation is conducted on five feed blends, each having a different blend of ore samples as shown in Table 5. The blended feed samples are subjected to pressure oxidation in a continuous pilot plant as described in Example 1, at a temperature of 225° C. Following pressure oxidation, samples of the autoclave discharge are subjected to carbon-in-leach cyanidation to determine gold recoveries as described in Example 1.

Figure 7:
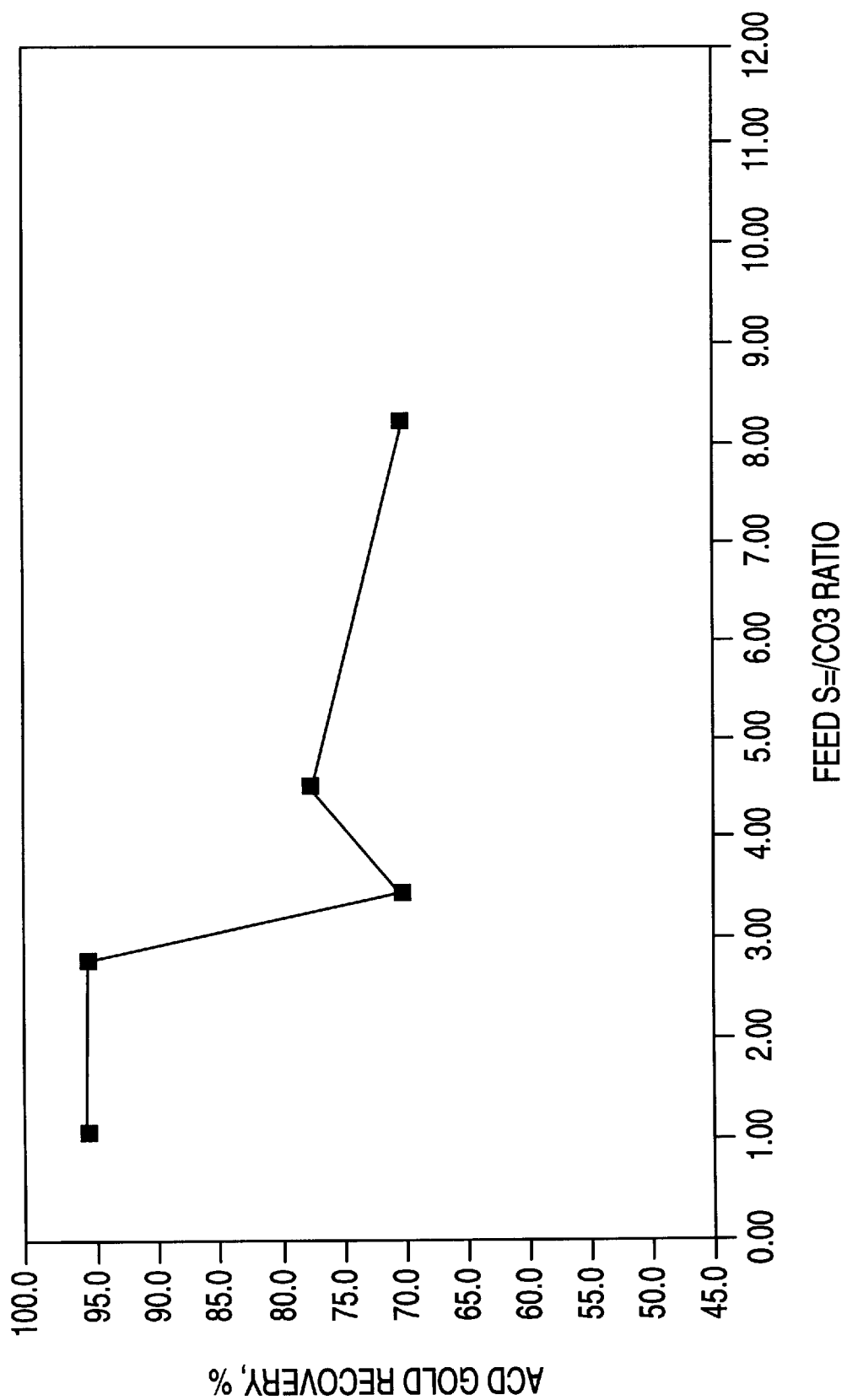
FIG. 7 is a graph showing the effect of blending ores with different carbonate contents on gold recovery according to the present invention.

Results are shown graphically in FIG. 7 and tabularly in Table 5. As seen in FIG. 7 and Table 5, gold recovery generally increases for blends having a lower weight ratio of sulfide sulfur to carbonate.

Figure 9:
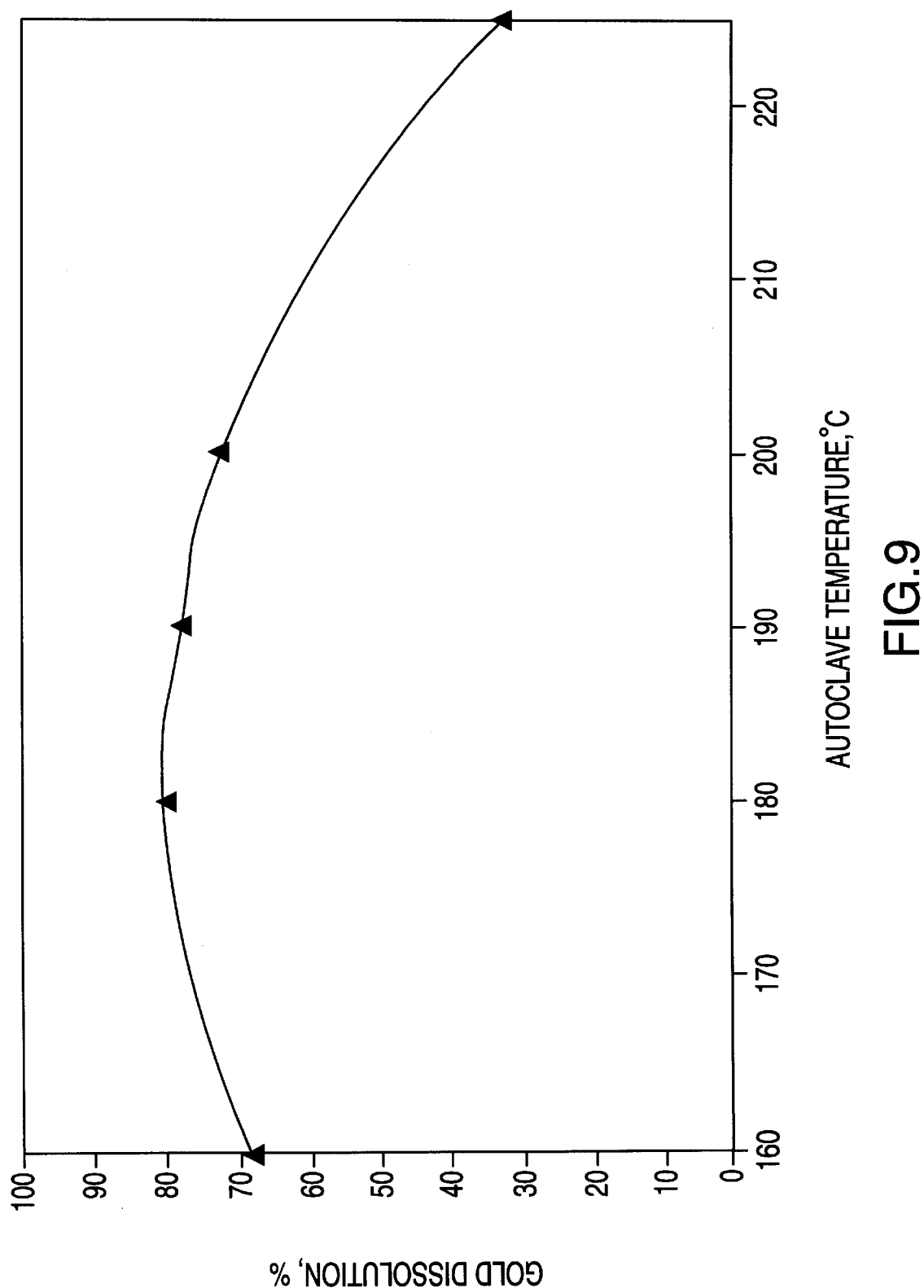
FIG. 9 is a graph showing the effect of pressure oxidation temperature on gold recovery according to the present invention.

A composite sample is made from 50 weight percent of ore sample H and 50 weight percent of ore sample I. This composite sample is subjected to batch pressure oxidation with a retention time of at least 120 minutes and at varying temperatures. Results are shown tabularly in Table 6 and graphically in FIG. 9. Table 6 and FIG. 9 show that gold recovery is highly sensitive to temperature, with gold recovery at 180° C. being at around 80 percent compared to a gold recovery of only about 30% percent at 225° C. Again, such results are contrary to conventional thought concerning the effect of increased pressure oxidation temperature on gold recovery.

TABLE 5

| Blend | | | | | Wt. Ratio | | |
|---|---|---|---|---|---|---|---|
| A wt % | D wt % | E wt % | F wt % | Temp °C. | Sulfide Sulfur to Carbonate | Gold Recovery % | Halogen[1] mg/l |
| 100 | 0 | 0 | 0 | 225 | 8.23 | 69.5 | |
| 85 | 15 | 0 | 0 | 225 | 4.56 | 77.2 | 247 |
| 75 | 25 | 0 | 0 | 225 | 3.49 | 70.0 | 146 |
| 66 | 34 | 0 | 0 | 225 | 2.85 | 95.2 | 110 |
| 56.5 | 0 | 6.0 | 37.5 | 225 | 1.13 | 95.5 | 229 |

[1]Total of halogens titrated by silver nitrate (Cl⁻, Br⁻, I⁻) in discharge liquid

EXAMPLE 5

This example demonstrates the detrimental effect of the presence of a chloride-containing material during pressure oxidation of a gold-bearing sulfide ore that also contains organic carbonaceous material.

Ore sample G is subjected to pressure oxidation in a batch autoclave under semicontinuous conditions. The autoclave is operated at 225° C. with an oxygen overpressure of 100 psig.

A slurry of the feed sample is first treated with sulfuric acid to a pH of 2. The feed samples is then subjected to pressure oxidation in a batch autoclave at the desired treating conditions for two hours. Batches of additional feed slurry are then pumped into the autoclave every fifteen or twenty minutes, depending on the desired cycle time, and an equivalent amount of material is removed from the autoclave. Four consecutive discharge samples are combined and subjected to carbon-in-leach cyanidation as described in Example 1.

After the pressure oxidation has initially stabilized, new batches introduced into the autoclave are spiked with potassium chloride in an amount to provide 0.015 weight percent of chloride relative to the weight of the ore sample of each new batch. Twelve cycles later the chloride level in the feed was increased to 0.030 percent chloride. Twenty cycles later, potassium chloride in the feed batch is discontinued. The test is run for an additional ten cycles and discontinued. During the last ten cycles, two-batch composites are subjected to carbon-in-leach cyanidation rather than the normal four-batch composites previously described.

Figure 8:
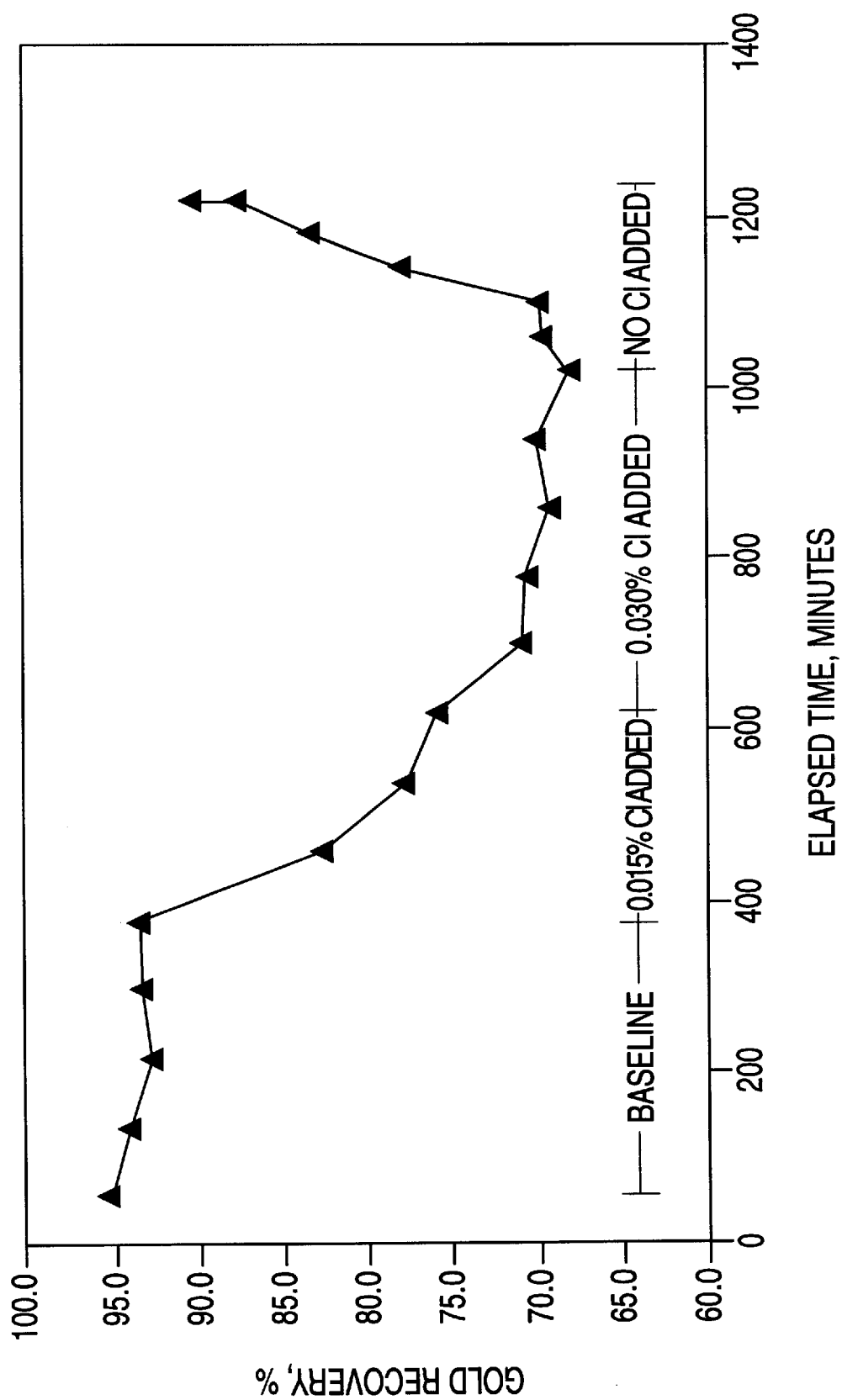
FIG. 8 is a graph showing the effect of the addition of a chloride salt to pressure oxidation feed.

Results are shown graphically in FIG. 8. From an initial base gold recovery of over 90%, gold recoveries dropped to below 70% after the addition of the potassium chloride. After cessation of chloride addition, gold recoveries climbed back to over 90%, indicating that the system was recovering.

EXAMPLE 6

This example demonstrates pressure oxidation of ore samples having naturally-occurring halogen-containing material and sensitivity of gold recovery to the treating temperature.

TABLE 6

| Temp °C. | Gold Recovery % | Halogen[1] mg/l |
|---|---|---|
| 225 | 31.9 | 15 |
| 200 | 71.9 | 41.7 |
| 190 | 77.4 | 60.6 |
| 180 | 80.1 | 20.0 |
| 160 | 68.6 | 41.7 |

[1]Total of halogens titrated by silver nitrate (Cl⁻, Br⁻, I⁻) in discharge liquid

EXAMPLE 7

This example demonstrates reduction in the susceptibility of gold to be captured and held by organic carbonaceous material through restriction of the amount of oxygen fed into the autoclave during pressure oxidation, preventing substantially complete oxidation of ferrous iron to ferric iron.

A blend of 50 weight percent ore sample H and 50 weight percent of ore sample I is subjected to batch pressure oxidation processing at a treating temperature of 225° C. and a retention time of 90 minutes. In one test, the batch autoclave is loaded with the slurried sample and oxygen gas to a sufficient excess so that an unrestricted supply of oxygen will be available during pressure oxidation. In a second test, the amount of oxygen is limited to a stoichiometric amount assuming complete oxidation of all sulfide sulfur to a sulfate form and assuming that at the end of the pressure oxidation all iron will be in the ferrous state. Discharge from the autoclave for each test is subjected to carbon-in-leach cyanidation as described in Example 1. Gold recovery is measured at 74.3% for the test with restricted oxygen, compared to 31.9% for the test with unrestricted oxygen.

Preferred embodiments of the pressure oxidation processing in the present invention have been described herein. It should be recognized, however, that the present invention is not so limited. Any feature of any embodiment may be combined with any compatible feature of any other embodiment. Furthermore, the foregoing description of the invention has been presented for purposes of illustration and description. The description is not intended to limit the variations and modifications commensurate with the above teachings, and the skill or knowledge in the relevant art are within the scope of the present invention. The preferred embodiment described above is further intended to explain the best mode known of practicing the invention and to enable others skilled in the art to utilize the invention in various embodiments and with the various modifications required by their particular applications or uses of the invention. It is intended that the appended claims be construed to include alternative embodiments to the extent permitted by the prior art.

What is claimed is:

1. A method of oxidatively treating a gold-bearing mineral material feed to facilitate recovery of gold, the mineral material feed having sulfide material from which gold is difficult to separate and having organic carbonaceous material that has an affinity for at least one member of the group consisting of gold and a gold complex, the mineral material feed being pressure oxidized in the presence of a solubilized form of a halogen which, when in the presence of the organic carbonaceous material, is capable of interfering with gold recovery, the method comprising the steps of:

pressure oxidizing, in an oxidizing environment at elevated temperature and elevated pressure, a feed, having said mineral material feed slurried with aqueous feed liquid, to free gold from said association with said sulfide material to facilitate recovery of said gold;

said feed comprising halogen-containing material having halogen, wherein during said step of pressure oxidizing said halogen is in a solubilized form that is capable of complexing with gold that is freed from said association with said sulfide material;

said organic carbonaceous material, during said step of pressure oxidizing, being capable of capturing and holding gold when said organic carbonaceous material is in the presence of said solubilized form of said halogen;

effluent from said step of pressure oxidizing comprising solid residue and aqueous effluent liquid;

wherein, said step of pressure oxidizing is conducted under conditions to suppress the susceptibility of said gold to be captured and held by said organic carbonaceous material, such that following said step of pressure oxidation, greater than about 75 percent of said gold from said mineral material feed is removable from said solid residue by carbon-in-leach cyanidation;

said conditions including at least one condition selected from the group consisting of:

(i) a temperature of lower than about 215° C.;

(ii) a ratio, on a weight basis, of sulfide sulfur to carbonate in said mineral material feed of smaller than about 4 to 1;

(iii) said aqueous effluent liquid has an oxidation/reduction potential of smaller than about 700 millivolts, relative to a standard hydrogen electrode;

(iv) said aqueous effluent liquid comprises sulfuric acid in an amount of less than about 28 grams of free sulfuric acid per liter;

(v) said step of pressure oxidizing is conducted in the presence of carbon dioxide at a partial pressure that is larger than a partial pressure that would be exerted by carbon dioxide generated during said step of pressure oxidizing from carbon released by decomposition of said mineral material feed;

(vi) said step of pressure oxidizing is conducted in the presence of a component that causes formation of a halogen-containing reaction product that is insoluble in aqueous liquid present during said step of pressure oxidizing;

(vii) said step of pressure oxidizing is conducted in the presence of a component capable of forming a complex, that does not comprise gold, with said solubilized form of said halogen to bind at least a portion of said halogen and thereby inhibit formation of a gold complex with said solubilized form of said halogen, said complex being soluble during said step of pressure oxidizing;

(viii) said step of pressure oxidizing is conducted in a reactor with the addition of oxygen gas to the reactor in an amount that is small enough, under reaction conditions present in said reactor, to prevent substantially complete oxidation of ferrous iron to ferric iron during said step of pressure oxidizing;

(ix) said step of pressure oxidizing is conducted in a batch operation;

(x) said step of pressure oxidizing is for a time of shorter than about 45 min; and (xi) said mineral material feed comprises a blend of a first mineral material and a second mineral material, wherein said second mineral material has a higher carbonate content than said first mineral material.

2. The method of claim 1, wherein:

said solid residue comprises carbonaceous solid residue of said organic carbonaceous material and said step of pressure oxidizing is performed under conditions such that, in said solid residue, less than about 25 percent of gold originally in said mineral material feed is held by said solid carbonaceous residue.

3. The method of claim 1, wherein:

said halogen, of said halogen-containing material, is present in said feed in an amount that is larger than about 20 parts per million by weight of halogen relative to the weight of said mineral material.

4. The method of claim 1, wherein said halogen, of said halogen-containing material, is present in said feed in an amount that is larger than about 35 parts per million by weight of said halogen relative to the weight of said mineral material.

5. The method of claim 1, wherein:

said halogen is selected from the group consisting of chlorine, bromine, iodine and combinations thereof.

6. The method of claim 1, wherein:

said solubilized form of said halogen comprises a halide.

7. The method of claim 1, wherein:

said halogen comprises chlorine.

8. The method of claim 1, wherein:

said mineral material feed is such that less than about 60% of said gold in said mineral material feed is removable from said mineral material feed by direct cyanide leaching of said mineral material feed.

9. The method of claim 1, wherein:

said organic carbonaceous material comprises greater than about 0.3 weight percent of said mineral material feed.

10. The method of claim 1, wherein:

said step of pressure oxidizing is conducted at a temperature of lower than about 205° C.

11. The method of claim 1, wherein:

said step of pressure oxidizing is conducted at a temperature of lower than about 195° C.

12. The method of claim 1, wherein:
said mineral material feed comprises a ratio, on a weight basis, of sulfide sulfur to carbonate of from about 0.5 to 1 to about 2 to 1.

13. The method of claim 1, wherein:
said aqueous effluent liquid comprises sulfuric acid in an amount of less than about 20 grams of free sulfuric acid per liter.

14. The method of claim 1, wherein:
said aqueous effluent liquid comprises sulfuric acid in an amount of from about 7 grams of free sulfuric acid per liter to about 25 grams of free sulfuric acid per liter.

15. The method of claim 1, wherein:
said aqueous effluent liquid has an oxidation/reduction potential of smaller than about 650 millivolts, relative to a standard hydrogen electrode.

16. The method of claim 1, wherein:
said aqueous effluent liquid has an oxidation/reduction potential that is at least about 25 millivolts, relative to a standard hydrogen electrode, smaller than an oxidation/reduction potential that would exist if said feed were pressure oxidized in a continuous operation under the following conditions: a temperature of about 225° C., an oxygen overpressure of about 100 psia, a residence time of about one hour, and free sulfuric acid in said aqueous effluent liquid of about 30 grams per liter.

17. The method of claim 1, wherein:
said step of pressure oxidizing is for a time of shorter than about 30 minutes.

18. The method of claim 1, wherein:
said step of pressure oxidizing is conducted in the presence of a component that causes formation, during said step of pressure oxidizing, of a halogen-containing complex that is insoluble in aqueous liquid present during said step of pressure oxidizing.

19. The method of claim 18, wherein:
said component comprises at least one member selected from the group consisting of silver, mercury, lead and bismuth.

20. The method of claim 1, wherein:
said step of pressure oxidizing is conducted in the presence of a component capable of forming a soluble complex that does not comprise gold and that is soluble during said step of pressure oxidizing, said complex comprising said solubilized form of said halogen to bind at least a portion of said halogen to inhibit formation of a gold complex with said solubilized form of said halogen.

21. The method of claim 20, wherein:
said component comprises at least one member selected from the group consisting of copper, lead, zinc, cobalt, bismuth, zirconium and tin.

22. The method of claim 1, wherein:
said mineral material feed comprises a blend of a first mineral material and a second mineral material, wherein said second mineral material is richer in carbonate than said first mineral material; and
said mineral material feed comprises a ratio of sulfide sulfur to carbonate, on a weight basis, that is smaller than about 3 to 1.

23. The method of claim 22, wherein:
said sulfide sulfur to carbonate ratio is from about 0.5 to 1 to about 2 to 1.

24. The method of claim 1, wherein:
said halogen-containing material is initially dissolved in a recycle aqueous liquid that makes up, at least in part, said aqueous feed liquid.

25. The method of claim 1, wherein:
said halogen, in said feed, is substantially entirely a part of said mineral material feed.

26. The method of claim 1, wherein:
aqueous effluent liquid from said step of pressure oxidizing has a pH of smaller than about pH 1.5.

27. The method of claim 1, wherein:
said solid residue from said step of pressure oxidizing is subjected to cyanide leaching; and
during said step of cyanide leaching, greater than about 75% of gold originally in said mineral material feed is removed from said solid residue.

28. The method of claim 27, wherein:
said cyanide leaching comprises a carbon-in-leach cyanidation of said solid residue.

29. The method of claim 27, wherein:
during said step of cyanide leaching, greater than about 80% of gold originally in said mineral material feed is removed from said solid residue.

30. The method of claim 27, wherein:
during said step of cyanide leaching, greater than about 85% of gold originally in said mineral material feed is removed from said solid residue.

31. The method of claim 1, wherein:
said step of pressure oxidizing is conducted under continuous operating conditions other than comparison continuous operating conditions consisting essentially of the following: temperature of about 225° C., oxygen overpressure of about 100 psia, residence time of about one hour, effluent liquid having sulfuric acid in an amount of about 30 grams of free sulfuric acid per liter; and
greater than about 25% more gold is removable from said solid residue by carbon-in-leach cyanidation than if said step of pressure oxidizing is conducted under said comparison operating conditions.

* * * * *